United States Patent [19]
Somers et al.

[11] Patent Number: 5,948,293
[45] Date of Patent: Sep. 7, 1999

[54] LASER SHOCK PEENING QUALITY ASSURANCE BY VOLUMETRIC ANALYSIS OF LASER SHOCK PEENED DIMPLE

[75] Inventors: Ralph M. Somers; Marek L. Winiarz; James D. Risbeck, all of Cincinnati, Ohio

[73] Assignee: General Electric Company, Cincinnati, Ohio

[21] Appl. No.: 09/204,878

[22] Filed: Dec. 3, 1998

[51] Int. Cl.[6] .................................................. B23K 26/00
[52] U.S. Cl. ........................ 219/121.85; 72/53; 73/11.02
[58] Field of Search ........................ 219/121.69, 121.85, 219/121.83; 72/53, 19.6; 73/11.02; 148/525

[56] References Cited

U.S. PATENT DOCUMENTS

| | | | |
|---|---|---|---|
| 2,350,440 | 6/1944 | Almen | 73/11.02 |
| 3,631,713 | 1/1972 | Marom . | |
| 3,850,698 | 11/1974 | Mallozzi et al. | 148/525 X |
| 4,139,302 | 2/1979 | Hung et al. . | |
| 4,426,867 | 1/1984 | Neal et al. . | |
| 4,718,749 | 1/1988 | Chiou et al. . | |
| 5,003,805 | 4/1991 | Thompson | 72/53 |
| 5,146,289 | 9/1992 | Newman . | |
| 5,166,885 | 11/1992 | Thompson . | |
| 5,172,580 | 12/1992 | Thompson . | |
| 5,189,490 | 2/1993 | Shetty et al. . | |
| 5,204,826 | 4/1993 | Thompson et al. . | |
| 5,272,312 | 12/1993 | Jurca . | |
| 5,293,320 | 3/1994 | Thompson et al. | 72/53 X |
| 5,339,152 | 8/1994 | Horn . | |
| 5,432,595 | 7/1995 | Pechersky . | |
| 5,492,447 | 2/1996 | Mannava et al. . | |
| 5,519,486 | 5/1996 | Baird et al. . | |
| 5,523,839 | 6/1996 | Robinson et al. . | |
| 5,531,570 | 7/1996 | Mannava et al. . | |
| 5,571,575 | 11/1996 | Takayanagi | 427/554 X |
| 5,591,009 | 1/1997 | Mannava et al. . | |
| 5,625,664 | 4/1997 | Berkley . | |
| 5,671,042 | 9/1997 | Sciammarella . | |
| 5,674,328 | 10/1997 | Mannava et al. . | |
| 5,674,329 | 10/1997 | Mannava et al. . | |
| 5,681,490 | 10/1997 | Chang . | |
| 5,741,559 | 4/1998 | Dulaney | 427/554 |
| 5,744,781 | 4/1998 | Yeaton | 219/121.84 |
| 5,756,965 | 5/1998 | Mannava . | |

FOREIGN PATENT DOCUMENTS

| | | |
|---|---|---|
| 085278 | 8/1983 | European Pat. Off. . |
| 861917 | 9/1998 | European Pat. Off. . |

OTHER PUBLICATIONS

"The Development of New Type Almen Strip for Measurement of Peening Intensity on Hard Shot Peening", by Y. Watanabe, K. Namiki, Sep., 1992, 6 pages.

"New Results In Measuring The Shot Peen Interface In Ti6A14V", by Eddy Current, Jul., 1991, 11 pages.

"X–Ray Diffraction Characterization of Residual Stresses Produced by Shot Peening", by Paul S. Prevey, pp. 82–93.

"Full Assurance Shot Peening Of Aircraft Gas Turbine Engine Components", by PG Bailey, DR Lombardo, HG Popp, RA Thompson, 1996, pp. 320–327.

(List continued on next page.)

*Primary Examiner*—Gregory Mills
*Attorney, Agent, or Firm*—Andrew C. Hess; Gerry S. Gressel

[57] ABSTRACT

A method for quality assurance of a laser shock peening process that quantitatively analyzes a single laser shock peened dimple or spot. The method measures a first interior surface of the first dimple to obtain height data and the processes the height data to obtain production volumetric data of the dimple. The volumetric data may then be compared to a predetermined correlation of test volumetric data and high cycle fatigue failure based on high cycle fatigue tests of test pieces that were laser shock peened in the same or similar laser shock peening apparatus as the production workpieces. The test pieces may each have a failure precipitating flaw within a laser shock peened area of the test piece that was laser shock peened in the same or similar laser shock peening apparatus. Preferably, the measuring is performed using a profilometer such as an interferometric optical profilometer.

19 Claims, 8 Drawing Sheets

OTHER PUBLICATIONS

"Residual Stress Measurement For Quality Control of Shot Peening", by Lambda Research, 2 pages.

"Laser shocking extends fatigue life", by John A. Vaccari, American Machinist, Jul., 1992, 3 pages.

"Laser Shock Processing Increases the Fatigue Life of Metal Parts", Materials and Processing Report, Sep., 1991, pp. 3–5.

"Shearography", ETH Zurich, Festigkeit, Versuch und Messtechnik, Prof. Dr. M. Meier, Jul. 16, 1998, 5 pages.

"Holographic Interferometry", Jul. 16, 1998, 2 pages.

"Metrology", WYKO Optical Profilers, Veeco Home, Internet Document, http://www.veeco.com, Jul. 9, 1998, 9 pages.

"Interferometer Handles the Rough Job", by Jeff Sasmar and Paul Caber, Photonics Spectra, Nov. 1996, pp. 93–98.

"Technical Reference Manual", by Sharon Lippold and Jan Podlesny, WYKO Surface Profilers, WYKO Corp., May 1996.

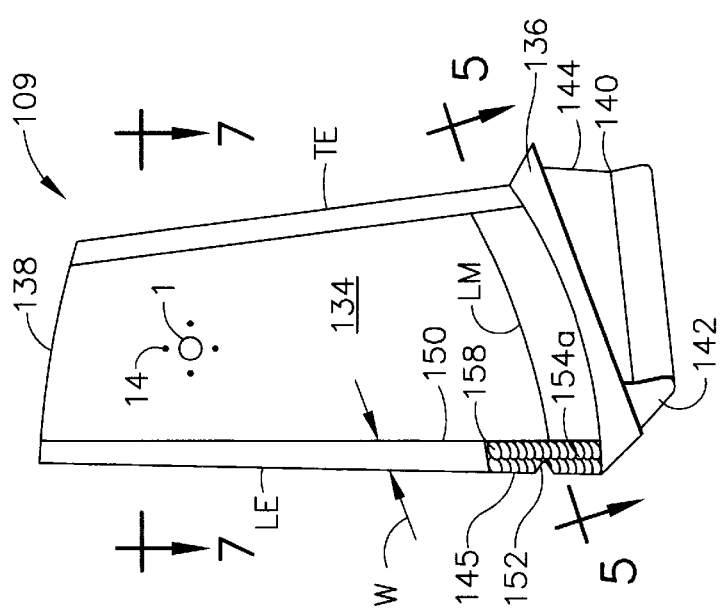
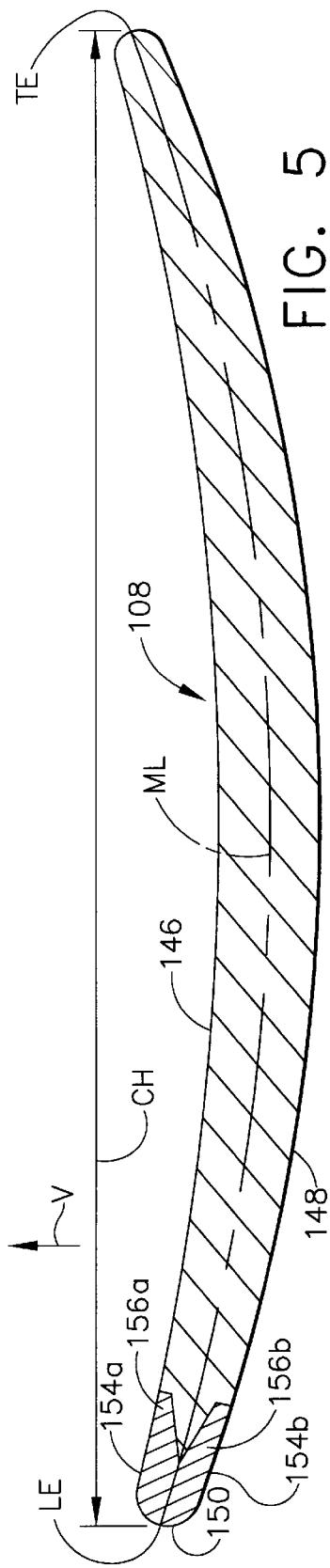

LASER SHOCK PEENING QUALITY ASSURANCE BY VOLUMETRIC ANALYSIS OF LASER SHOCK PEENED DIMPLE

BACKGROUND OF THE INVENTION

1. Field of the Invention

This invention relates to quality assurance methods and apparatus used for quality assurance for laser shock peened treatment of a substrate surface and, more particularly, for quantitative volumetric analysis of a single laser shock peened spot or dimple for quality assurance of a production laser shock peening process.

2. Description of Related Art

Laser shock peening or laser shock processing, as it is also referred to, is a process for producing a region of deep compressive residual stresses imparted by laser shock peening a surface area of a workpiece. Laser shock peening typically uses multiple radiation pulses from high power pulsed lasers to produce shock waves on the surface of a workpiece similar to methods disclosed in U.S. Pat. No. 3,850,6983, entitled "Altering Material Properties"; U.S. Pat. No. 4,401,477, entitled "Laser Shock Processing"; and U.S. Pat. No. 5,131,957, entitled "Material Properties". Laser shock peening, as understood in the art and as used herein, means utilizing a laser beam from a laser beam source to produce a strong localized compressive force on a portion of a surface by producing an explosive force by instantaneous ablation or vaporization of a painted or coated or uncoated surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". These methods typically employ a curtain of water flowed over the workpiece or some other method to provide a confining medium to confine and redirect the process generated shock waves into the bulk of the material of a component being LSP'D to create the beneficial compressive residual stresses.

Laser shock peening is being developed for many applications in the gas turbine engine field, some of which are disclosed in the following U.S. Pat. Nos.: 5,756,965 entitled "ON THE FLY LASER SHOCK PEENING"; 5,591,009, entitled "Laser shock peened gas turbine engine fan blade edges"; 5,569,018, entitled "Technique to prevent or divert cracks"; 5,531,570, entitled "Distortion control for laser shock peened gas turbine engine compressor blade edges"; 5,492,447, entitled "Laser shock peened rotor components for turbomachinery"; 5,674,329, entitled "Adhesive tape covered laser shock peening"; and 5,674,328, entitled "Dry tape covered laser shock peening", all of which are assigned to the present Assignee. These applications, as well as others, are in need of efficient quality assurance testing during production runs using laser shock peening.

LSP is a deep treatment of the material and it is desirable to have a quality assurance test that is indicative of a volumetric LSP effect. It is also desirable to have a QA method that is compatible with a dual sided or simultaneous dual sided LSP process wherein substantially equal compressive residual stresses are imparted to both sides of a workpiece, i.e. along the leading edge of a gas turbine engine fan blade.

One laser shock peening quality assurance technique previously used is high cycle fatigue (HCF) testing of blades having leading edges which are LSP'd and notched in the LSP'd area before testing. This method is destructive of the testpiece, fairly expensive and time consuming to carry out, and significantly slows production and the process of qualifying LSP'd components. An improved quality assurance method of measurement and control of LSP that is a non-destructive evaluation (NDE), inexpensive, accurate, and quick is highly desirable. It is also desirable to have an NDE quality assurance method that is relatively inexpensive and sufficiently economical to be used on each workpiece instead of a sampling of workpieces. LSP is a process that, as any production technique, involves machinery and is time consuming and expensive. Therefore, any techniques that can reduce the amount or complexity of production machinery and/or production time are highly desirable.

The present invention uses an interferometric profilometry method and apparatus to obtain volumetric data of a single laser shock peened test dimple created with a single firing of a laser used in the laser shock peening process. Interferometric and other types of profilometry are well known non-destructive evaluation or examination (NDE) methods and technologies used to evaluate surfaces. WYKO Optical Profilers by Veeco Instruments, Inc., Terminal Drive, Plainview, N.Y. 11803 is one well known manufacturer of optical profilometers suitable for use in the method of the present invention.

SUMMARY OF THE INVENTION

A method for quality control testing of a laser shock peening process of production workpieces includes the following steps: (a) mounting a test object having a metallic first test area in a laser shock peening apparatus, (b) forming at least one single first laser shock peened dimple in the first test area by firing a single pulse of a first laser beam from the laser shock peening apparatus such that beneath the first dimple is a first dimple region having deep compressive residual stresses imparted by the single pulse of the first laser beam, (c) measuring a first interior surface of the first dimple to obtain height data, and (d) processing the height data to obtain production volumetric data. The method may further include a step: (e) comparing the production volumetric data from step (d) from the production workpieces in a laser shock peening production run of the production workpieces to a predetermined correlation of test piece volumetric data and high cycle fatigue failure based on high cycle fatigue tests of test pieces that were laser shock peened in the same or similar laser shock peering apparatus. The test pieces may each have a failure precipitating flaw within a laser shock peened area of the test piece that was laser shock peened in the same or similar laser shock peening apparatus. Preferably, the measuring is performed using a profilometer such as an interferometric optical profilometer.

The test object may be a metallic coupon made of a material that is the same as or is similar to that of the production workpieces. A second laser shock peened dimple may be formed in a second laser shock peened test area on a second side of the test coupon opposite the first side of the test coupon opposite by simultaneously firing the single pulse of first beam and a single pulse of a second laser beam from the laser shock peening apparatus on the first and second laser shock peened test areas, respectively, such that beneath the second laser shock peened dimple is a second dimple region having deep compressive residual stresses imparted by the single pulse of the second laser beam.

In another embodiment of the present invention, the test object is one of the production workpieces having a first laser shock peened surface comprising overlapping laser beam spots and a first laser shocked region having deep compressive residual stresses imparted by laser shock peening extending into the production workpiece from the first laser shock peened surface and the test area is outside of the first laser shock peened surface.

The measuring in step (c) may include scanning the first interior surface of the first dimple in sections and then stitching together the sections and processing stitched together data to obtain the volumetric data. Marks corresponding to the sections may be placed outside of the dimple before the scanning so as to identify the sections for the stitching. The processing of the height data in step (d) may include masking out the dimple surface area to identify an undisturbed area around the dimple.

The method may be used for laser shock peening and quality control testing of the laser shock peening process of gas turbine production blades during a production run using the following steps: (a) mounting one of the production blades in a production laser shock peening apparatus and laser shock peening the production blade to form a production laser shock peened patch on the production blade, (b) forming at least a single first laser shock peened dimple in a metallic first test area by firing a single pulse of a first laser beam from the production laser shock peening apparatus such that beneath the first dimple is a first dimple region having deep compressive residual stresses imparted by the single pulse of the first laser beam, (c) measuring a first interior surface of the first dimple to obtain height data, (d) processing the height data to obtain production volumetric data, and (e) comparing the production volumetric data from step (d) from to a predetermined correlation of test volumetric data and high cycle fatigue failure based on high cycle fatigue tests of test blades having corresponding test laser shock peened patches. The first test area may be on a metallic test coupon made of a material that is the same as or is similar to that of the production blades or on an airfoil of one of the production blades wherein the production blade airfoil has a first laser shock peened surface comprising overlapping laser beam spots and a first laser shocked region having deep compressive residual stresses imparted by laser shock peening extending into the production workpiece frog the first laser shock peened surface and the test area is on the production blade outside of the first laser shock peened surface. Each of the corresponding test laser shock peened patches may contain at least one failure precipitating flaw such as a notch.

ADVANTAGES

Advantages of the present invention are numerous and include lowering the cost, time, man power and complexity of performing quality assurance tests during laser shock peening processes. The present invention reduces destructive testing of expensive workpieces. Another advantage of the present invention is that it allows performing quality assurance tests during laser shock peening processes at the site of the process and in real time with respect to the processing and on the component or workpiece being laser shock peened. This also allows for all the workpieces to be tested for quality assurance not just a sampling. The present invention can help greatly reduce the amount of down time for performing quality assurance tests during laser shock peening. The present invention replaces the tedious, costly and time consuming process of notched high cycle fatigue testing presently used for QA. One embodiment tests the same surface as the laser shock peened patch is applied to for quality assurance instead of by proxy such as with a test strip or coupon. This procedure is a more direct test of the laser shock peening process and parameters. Such parameters include laser energy and optics, and material and material processing of the workpieces (such as gas turbine engine blades). The QA process can be performed in tandem with the laser shock peening process of the actual component or workpiece, thus, allowing the testing to be performed at a point in time which is more contemporaneous in time and matches the state of the process for each specific component that is laser shock peened. Alternatively, components can be qualified on a lot-by-lot basis if so desired. The present invention provides a very dependable QA process due in a great part to its repeatability.

BRIEF DESCRIPTION OF THE DRAWINGS

The foregoing aspects and other features of the invention are explained in the following description, taken in connection with the accompanying drawings where:

FIG. 4 is a perspective view of a test fan blade exemplifying a test piece which is used to determine a correlation between high cycle fatigue failure and dimple volumetric data derived from the method illustrated in FIG. 1.

FIG. 5 is a cross-sectional view of the laser shock peened fan blades in FIGS. 1 and 4.

DETAILED DESCRIPTION OF THE INVENTION

Figure 1:
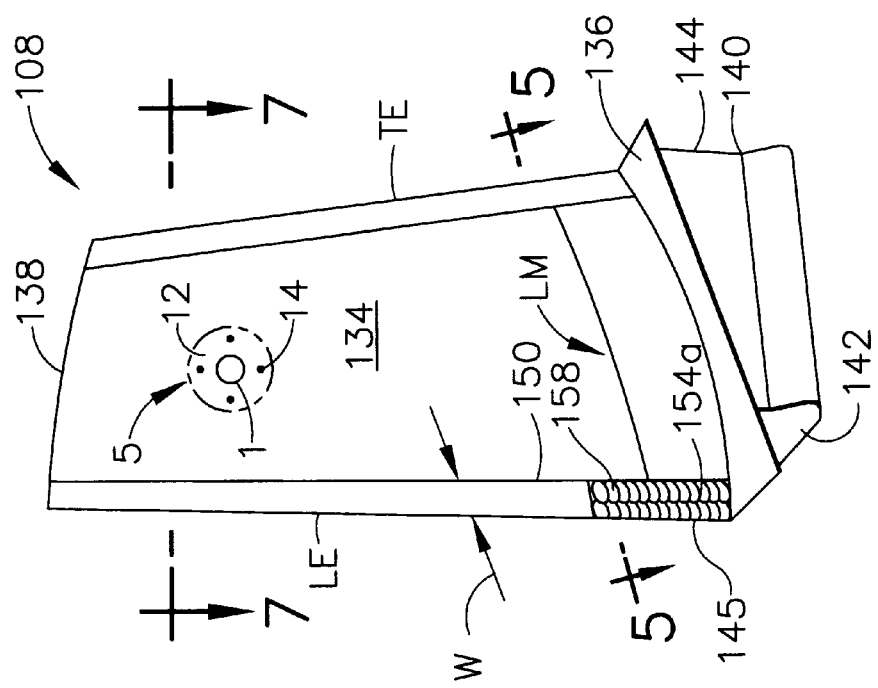
FIG. 1 is a perspective view of a production fan blade exemplifying a laser shock peened production workpiece in accordance with an exemplary embodiment of the present invention and having a dimple in accordance with a more particular exemplary second embodiment of the present invention.

The present invention provides a quality assurance method for quality control of a laser shock peening process used for production workpieces exemplified in FIG. 1 by a production fan blade 108 having a laser shock peened patch 145. Quality assurance is typically a go or no go, pass or fail, accept or reject type of test or analysis. The method and techniques of the present invention involves quality assurance of the laser shock peening process on a production workpiece such as the exemplary aircraft turbofan gas turbine engine fan blade 108 illustrated in FIG. 1. The method is a test which may be performed after or before each workpiece is laser shock peened or after or before a batch of workpieces are laser shock peened. The method starts with forming a single laser shock peened dimple 1 in a test area 12 on an object representative of the material of the workpieces such as a test coupon 10 in FIG. 2 or on a portion 5 of the workpiece that is not being laser shock peened such as on the side of an airfoil 134 of a blade 108 in FIG. 1 outside of the laser shock peened patch 145. The dimple is preferably formed using the same settings and conditions for a laser shock peening system 101 (illustrated in FIGS. 7 and 8) as those used in the production run of the workpieces for laser shock peening the workpieces such as the blade 108.

Figure 3:
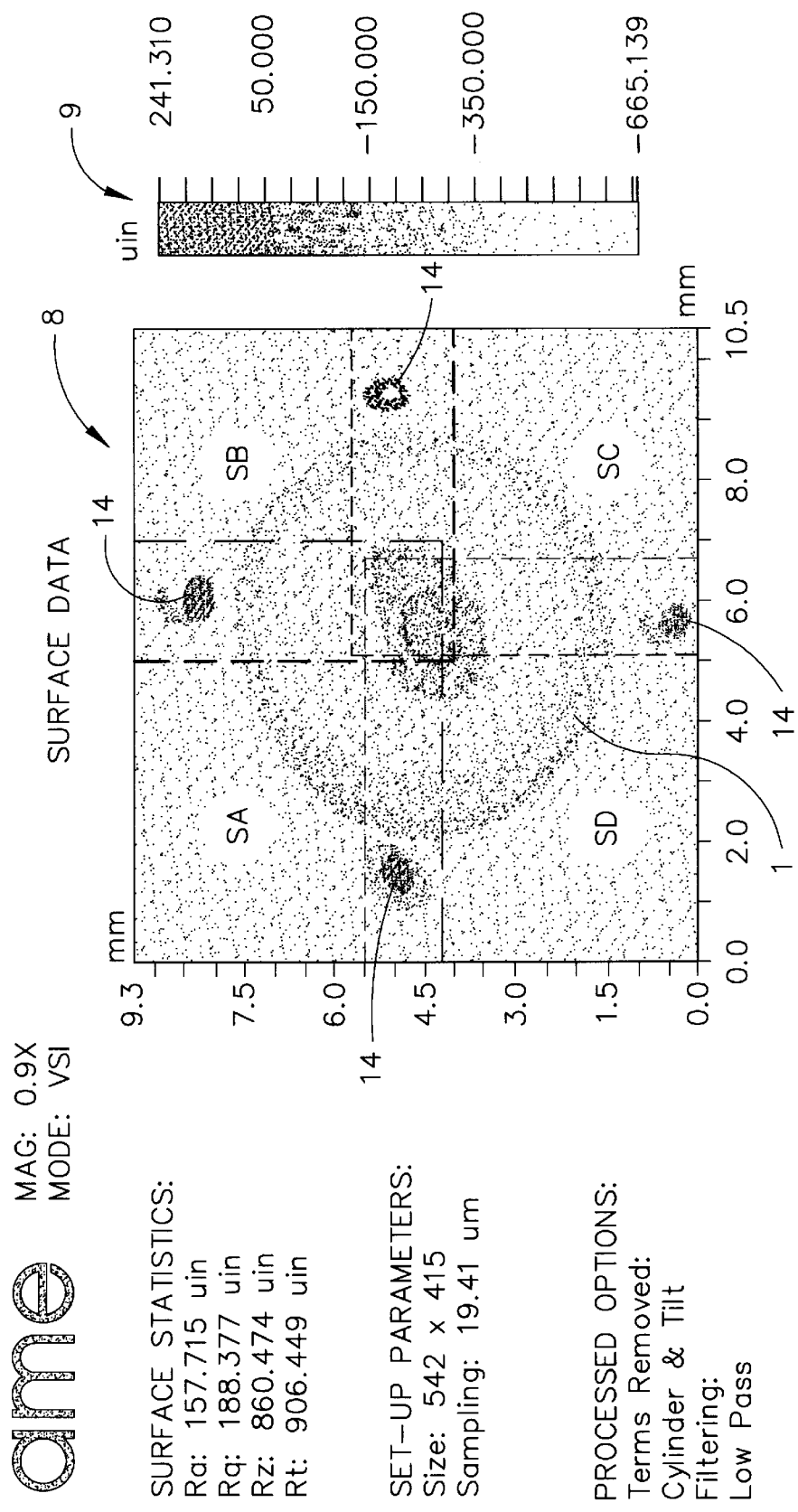
FIG. 3 is an illustration of a computer screen depicting colorized surface data derived from a scan of a single laser shock peened dimple as in FIGS. 1 and/or 2 in accordance with the method of the present invention.

Surface data of the dimple 1 is measured using a profilometer not shown in the FIGS. FIG. 3 is a schematic representation of a computer screen illustrating colorized surface height data 8 in (microinches), derived from a scan of the laser shock peened dimple 1 in the test area 12 by the profilometer, displayed with a colorized scale 9. The scan of the laser shock peened dimple 1 is preferably performed using an optical profilometer such as an optical interferometric profilometer. The optical interferometric profilometer used in the development of the present invention is a Wyko Surface Optical Profiler and profiler software used to perform the analysis is WYKO Vision software available from Veeco Instruments Inc. The measuring may be done in sections such as first, second, third, and fourth overlapping sections SA, SB, SC, and SD, respectively, as illustrated in FIG. 3. The sections SA-SD are identified for the profilometer operator and the profiler software by placing four marks 14 around the dimple 1, as illustrated in FIG. 1, such that at least two marks are scanned in each of the sections. Then the scanning is performed in each overlapping sections and sections are stitched together and stitched together data is processed to obtain the volumetric data as illustrated in FIG. 3. Marks corresponding to the sections may be placed outside of the dimple before the scanning so as to identify the sections for the stitching. FIG. 3 is an illustration of one display screen in the Vision software. The surface data shown is also integrated by the software to obtain a volume of the dimple. The volume is then used as the control parameter for the QA method of the present invention. The processing of the height data may include masking out the dimple surface area to identify an undisturbed area around the dimple. Masking is a commonly used method to improve such analysis. During production runs values are compared to pre-determined criteria for passing or failing the workpieces.

Figure 6:
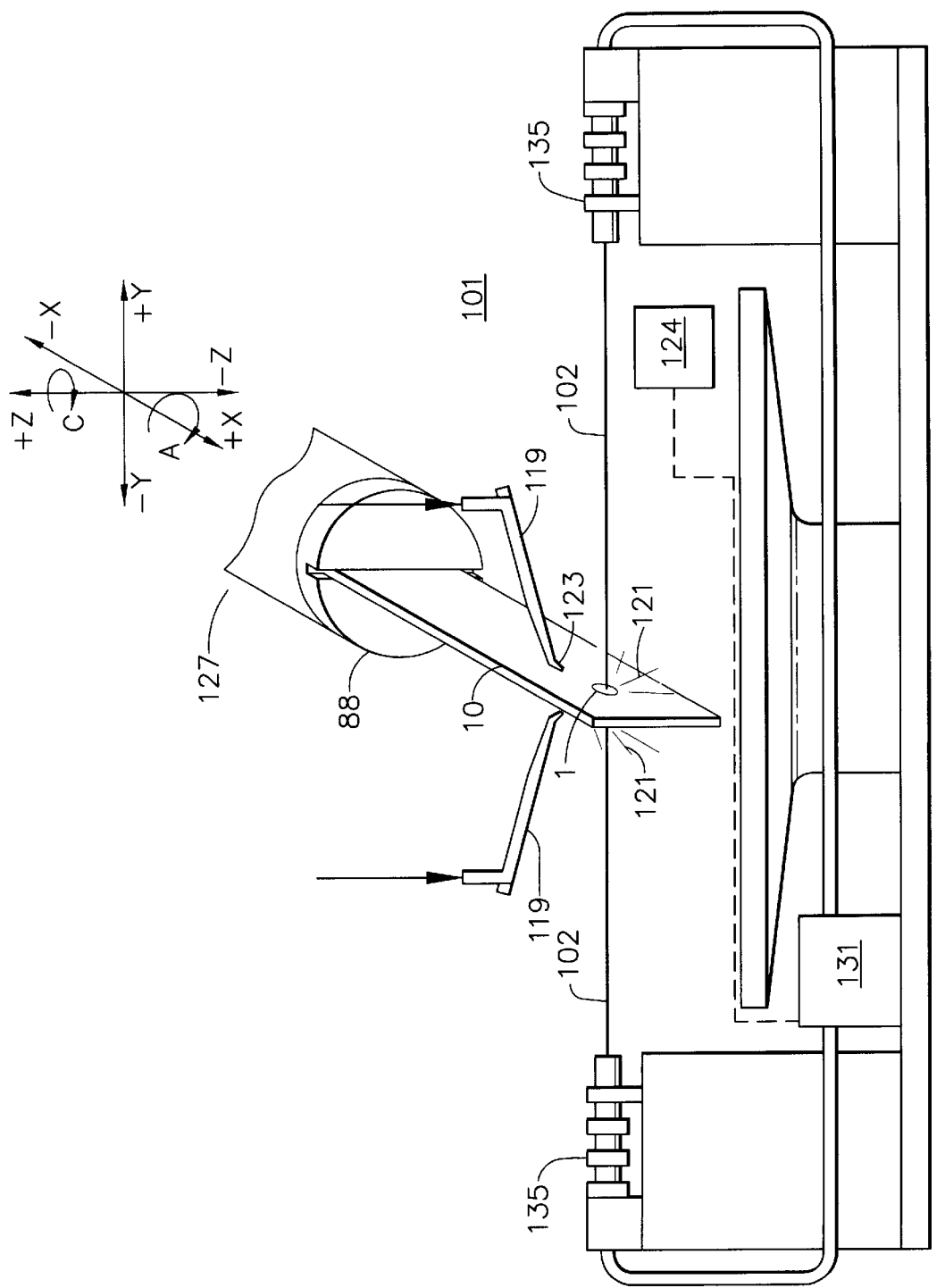
FIG. 6 is a schematic perspective illustration of the test coupon in FIG. 2 mounted in a laser shock peening system in accordance with the first exemplary embodiment of the present invention.
Figure 7:
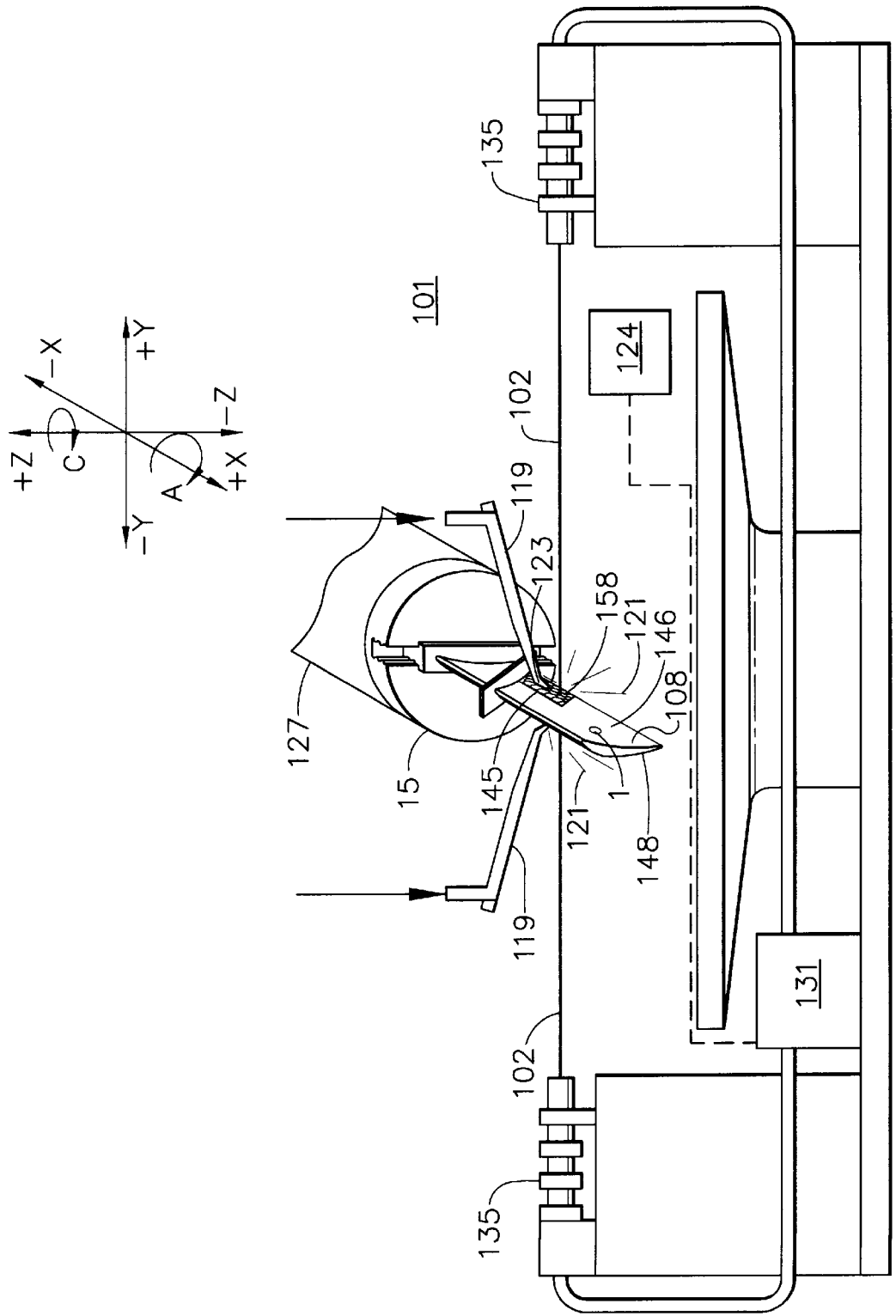
FIG. 7 is a schematic perspective illustration of the blade of FIG. 3 mounted in a laser shock peening system in accordance with the second exemplary use of the present invention.

The pre-determined criteria are preferably based on a correlation of volumetric test data versus high cycle fatigue data of test versions of the workpieces that are exemplified by laser shock peened and notched test blades 109 illustrated in FIG. 4. The test area 12 is illustrated on the test coupon 10 in FIG. 2 and on the actual work piece or production blade 108 in FIG. 1. The laser shock peened dimple 1 is formed in the test area 12 during production runs of the work pieces in the laser shock peening system 101 for laser shock peening the production blade 108 as illustrated in FIG. 7 and for the coupon 10 as illustrated in FIG. 6.

Referring to FIGS. 1 and 5, the production fan blade 108 includes an airfoil 134 extending radially outward from a blade platform 136 to a blade tip 138 and a root section 140 extending radially inward from the platform 136. The root section 140 has a blade root 142 connected to the platform 136 by a blade shank 144. The airfoil 134 extends in the chordwise direction between a leading edge LE and a trailing edge TE of the airfoil. A chord CH of the airfoil 134 is the line between the leading edge LE and trailing edge TE at each cross-section of the blade as illustrated in FIG. 5. A pressure side 146 of the airfoil 134 faces in the general direction of rotation as indicated by an arrow V and a suction side 148 is on the other side of the airfoil and a mean-line ML is generally disposed midway between the two sides in the chordwise direction.

The fan blade 108 has a leading edge section 150 that extends along the leading edge LE of the airfoil 134 from the blade platform 136 to the blade tip 138. The leading edge section 150 includes a predetermined first width W such that the leading edge section 150 encompasses an area where nicks and tears that may occur along the leading edge of the airfoil 134 during engine operation. The airfoil 134 subject to a significant tensile stress field due to centrifugal forces generated by the fan blade 108 rotating during engine operation. The airfoil 134 is also subject to vibrations generated during engine operation and the nicks and tears operate as high cycle fatigue stress risers producing additional stress concentrations around them.

To counter fatigue failure of portions of the blade along possible crack lines that can develop and emanate from the nicks and tears the laser shock peened patch 145 is placed along a portion of the leading edge LE where incipient nicks and tears may cause a failure of the blade due to high cycle fatigue. The laser shock peened patch 145 is placed along a portion of the leading edge LE where an exemplary predetermined first mode line LM of failure may start. Within the laser shock peened patch 145, at least one and preferably both the pressure side 146 and the suction side 148 are simultaneously laser shock peened to form oppositely disposed first and second laser shock peened blade surfaces 154a and 154b and pre-stressed blade regions 156a and 156b, respectively, having deep compressive residual stresses imparted by laser shock peening (LSP) extending into the airfoil 134 from the laser shock peened surfaces as seen in FIG. 5. The pre-stressed blade regions 156a and 156b are illustrated along only a portion of the leading edge section 150 but may extend along the entire leading edge LE or longer portion thereof if so desired.

The quality assurance method of the present invention is performed during the laser shock peening processing of production blades 108. The QA method may be performed for each blade 108 as its laser shock peened patch 145 is formed. The QA test is preferably performed after each blade is laser shock peened forming the laser shock peened patch 145. The QA test may also be performed after a batch of blades 108 are laser shock peened. Preferably, the single laser shock peened dimple 1 is formed in the test area 12 with the same laser shock peening processing equipment and parameters as used for the production blades 108, preferably including the same strength laser beam, spot fluence and shape. This allows an operator on the production line to use this method to examine some or all of the production workpieces for quality assurance in real time and with a minimal impact on the overall production of the workpieces.

The high cycle fatigue (HCF) correlation of the test blades 109 is preferably based on fatigue testing of laser shock peened and notched test blades 109 as illustrated in FIG. 4, that are preferably full scale and notched to precipitate a failure. The test pieces or test blades 109 are preferably made the same way as the actual production blades 108 with a notch 152 added after the test blade 109 is laser shock peened to form the patch 145. The single laser shock peened dimple 1 formed in the test area 12 on the test coupon 10 in FIG. 2 or on the portion 5 of the test blade 109 that is not being laser shock peened outside of the laser shock peened patch 145. The dimple or dimples are scanned and the data stored for volumetric analysis. Then HCF testing may be used to establish pass/fail criteria for use during production runs to be compared to the results of the volumetric analysis and volumetric data resulting from the analysis. The volumetric data is recorded for correlation purposes later on and the blade 108 is vibrated at its first mode frequency until it fails. A number of test blades 109 or just one test blade 109 may be notched and subjected to high cycle fatigue tests to establish the correlation. For high cycle fatigue each test, one laser shock peened test blade 109 has a notch 152, representing a failure precipitating flaw, placed in the leading edge LE about a predetermined position of the pre-stressed blade regions 156a and 156b, respectively, after the blade is laser shock peened. Preferably, the notch 152 is also centered about a predetermined mode line such as the first mode line LM. If it meets standards or test criteria on length of time and amplitude of the forcing function that is exiting the blade then it is acceptable. These results can then be used during production runs to qualify the laser shock peening process. It is contemplated that one calibration can be used for an entire production run as long as the production laser shock peening parameters do not change.

Illustrated in FIG. 6 is a laser shock peening system 101 for producing the dimple 1 in the coupon 10 mounted in a first fixture 88 after laser shock peening the coupon production and test blades 108 and 109, respectively. The first fixture 88 is attached to a five-axis computer numerically controlled (CNC) manipulator 127.

Figure 2:
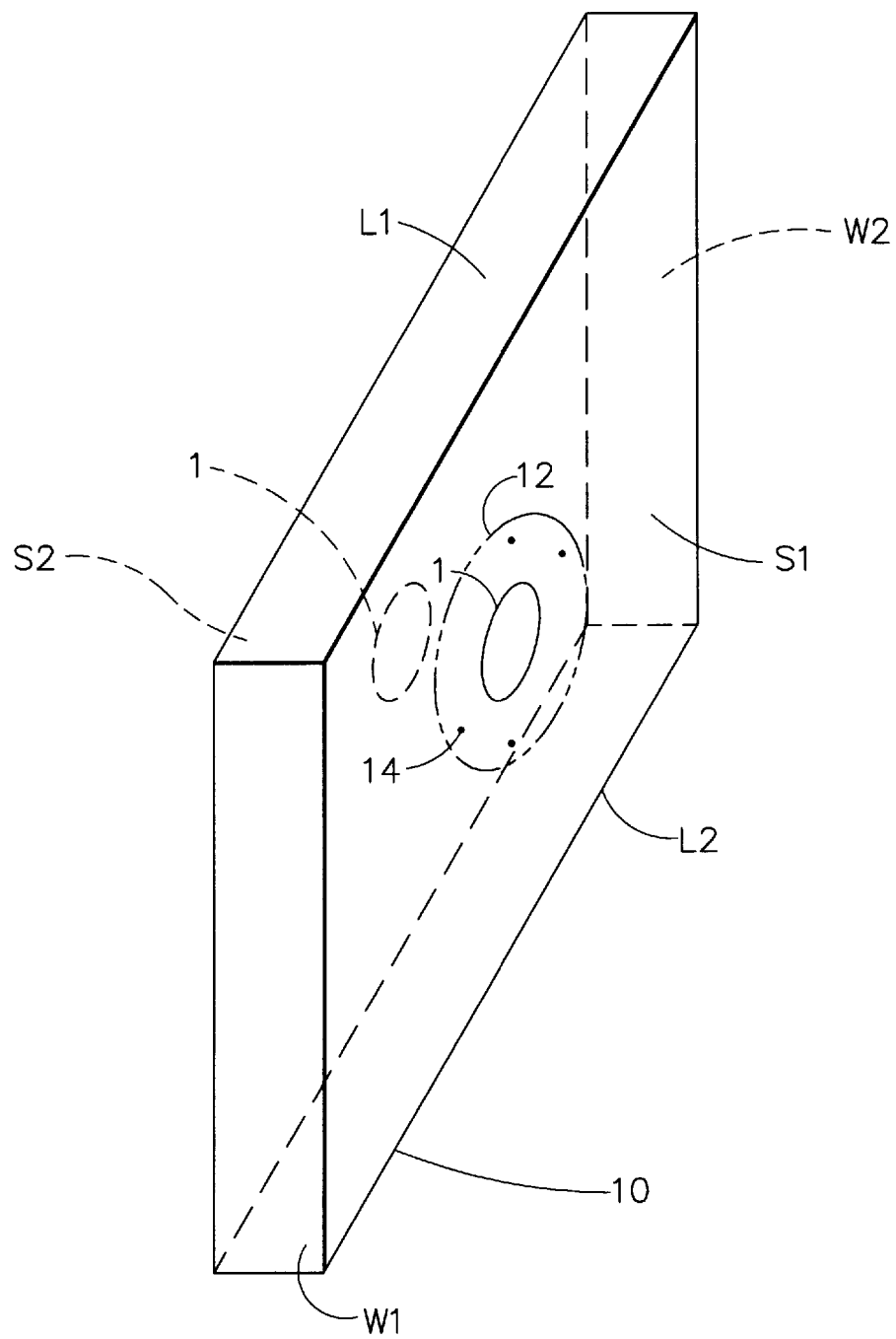
FIG. 2 is a schematic perspective view of a test coupon having a dimple in accordance with a more particular exemplary first embodiment of the present invention.
Figure 8:
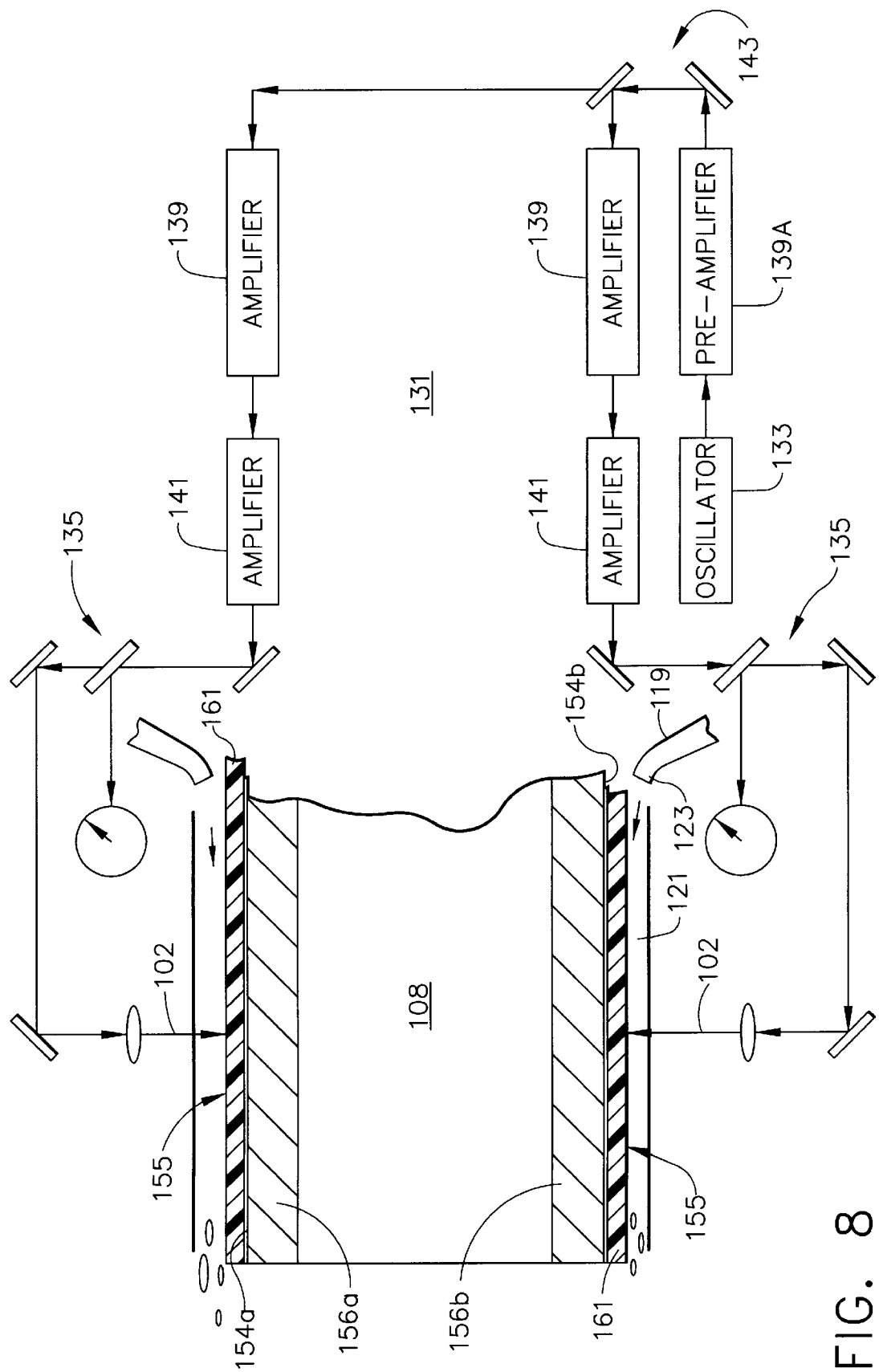
FIG. 8 is a schematic illustration of the laser shock peening process of the system in FIG. 7.

Illustrated in FIGS. 7 and 8 is the laser shock peening system 101 for laser shock peening the production and test blades 108 and 109, respectively. The illustrated production blade 108 is mounted in a second fixture 15 which is attached to the five-axis computer numerically controlled (CNC) manipulator 127, commercially available from the Huffman Corporation, having an office at 1050 Huffman Way, Clover, S.C. 29710. The five axes of motion that are illustrated in the exemplary embodiment are conventional translational axes X, Y and Z, and conventional rotational axes A and C that are well known in CNC machining. The manipulator 127 is preferably used to move and position the production blade 108 and to effect laser shock peening "on the fly" in accordance with a laser shock peening method and of the present invention. The manipulator 127 is used to continuously move and position the blade to provide laser shock peening "on the fly" in accordance with one embodiment of the present invention. Laser shock peening may be done in a number of various ways using paint or tape as an ablative medium (see - in particular U.S. Pat. No. 5,574,329 entitled "Adhesive Tape Covered Laser Shock Peening"). The same laser shock peening apparatus is then used to form the dimple 1. Alternatively, if the test coupon 10 in FIG. 2 is used to perform the QA test, it is placed in the first fixture 88 after one or more production blades 108 have been laser shock peened to form the patch 145. The Zest coupon 10 has flat first and second sides S1 and S2, respectively, is preferably rectangularly-shaped having first and second lengthwise edges L1 and L2 and first and second widthwise edges W1 and W2, respectively, and made of a metal that is the same or similar to that of the production blade 108. Preferably, two dipoles are formed, one on the first and second sides S1 and S2, respectively, by a single hit of each of the laser beam 102. The dimple 1 may be formed on bare metal surface of the test area 12 of the test coupon 10 or the portion 5 of the side of an airfoil 134 of the production blade 108.

Illustrated in FIGS. 7 and 8, in accordance with a preferred embodiment of the present invention, is the area of the workpiece or production blade 108 to be laser shock peened to form the laser shock peened patch 145. The first and second laser shock peened surfaces 154a and 154b, respectively, are covered with an ablative coating 161 such as paint or preferably adhesive tape to form a coated surface 155 as disclosed in U.S. Pat. Nos. 5,674,329 and 5,674,328. In the exemplary embodiments illustrated herein, layers of adhesive tape are used as the ablative coating 161. Other laser shock peening processes may paint the first and second Laser shock peened surfaces 154a and 154b for each sequence of laser shock peening firings. The paint and tape provide an ablative medium preferably over which is a clear containment medium which may be a clear fluid curtain such as a flow of water 121. Suitable materials for the ablative layer include plastic such as vinyl plastic film and foil. (see U.S. Pat. Nos. 5,674,329 and 5,674,328). One suitable source for the tape is Scotch Brand NO. 471 Plastic Film Tape which can be had with a black pigmented vinyl plastic backing, about 4 mils thick, and has a rubber adhesive layer, about 1 mil thick. The tape should be rubbed or otherwise pressed against the metallic material of the patch 145 to remove bubbles that may remain between the tape and the first and second laser shock peened surfaces 154a and 154b, respectively.

The laser beam shock induced deep compressive residual stresses may be produced by repetitively firing two high power laser beams 102, each of which is defocused ± a few mils with respect to the coated surfaces 155 on both the first and second laser shock peened surfaces 154a and 154b of the blade 108. Each of the laser beams is preferably fired through the curtain of flowing water 121 that is flowed over the coated surfaces 155. The production blade 108 is preferably continuously moved while continuously firing the stationary high power laser beams 102 through the curtain of flowing water 121 on the coated surfaces 155 and forming spaced apart laser shock peened circular spots 158. The paint, tape, or other ablative coating 161 is ablated generating plasma which results in shock waves on the surface of the material. These shock waves are re-directed towards the coated surface 155 by the curtain of flowing water 121 to generate travelling shock waves (pressure waves) in the material below the coated surface. The amplitude and quantity of these shockwaves determine the depth and intensity of compressive stresses. The ablative coating is used to protect the target surface and also to generate plasma. The laser beam shock induced deep compressive residual stresses in the compressive pre-stressed regions 156a and 156b are generally about 50–150 KPSI (Kilo Pounds per Square Inch) extending from the first and second laser shock peened surfaces 154a and 154b, respectively, to a depth of about 20–50 mils into the pre-stressed regions 156a and 156b. The production and test blades 108 and 109, respectively, are preferably laser shock peened the same way during production runs and HCF testing runs for the correlation.

The curtain of waver 121 is illustrated as being supplied by a conventional water nozzle 123 at the end of a conventional water supply tube 119. The laser shock peening system 101 has a conventional generator 131 with an oscillator 133 and a pre-amplifier 139A and a beam splitter 143 which feeds the pre-amplified laser beam into two beam optical transmission circuits each having a first and second amplifier 139 and 141, respectively, and optics 135 which include optical elements that transmit and focus the laser beam 102 on the coated surfaces 155. A controller 124 may be used to modulate and control the laser shock peening system 101 to fire the laser beams 102 on the coated surfaces 155 in a controlled manner. Ablated coating material is washed out by the curtain of flowing water 121. The same laser shock peening apparatus is then used to form the dimple 1 while the curtain of water 121 is flowed over the test area 12.

The preferred embodiment of the method of the present invention includes continuously moving the blade while continuously firing the laser beam on the taped surface and adjacent laser shock peened circular spots may be hit in different sequences. However, the laser beam may be moved instead just so long as relative movement between the beam and the surface is effected.

In accordance with one embodiment of the present invention, the first and second laser shock peened blade surface 154a and 154b before they are laser shock peened) of the blade 108 are covered by a layer of the adhesive tape and then the surfaces are laser shock peened forming overlapping laser shocked peened circular spots 158 as illustrated in FIGS. 1 and 4. The preferred laser shock peening processes includes coating or taping the first and second laser shock peened blade surface 154a and 154b, respectively, of the patch 145 for each sequence of laser shock peening firings. Several sequences may be used to cover the entire area of the patch 145.

Figure 9:
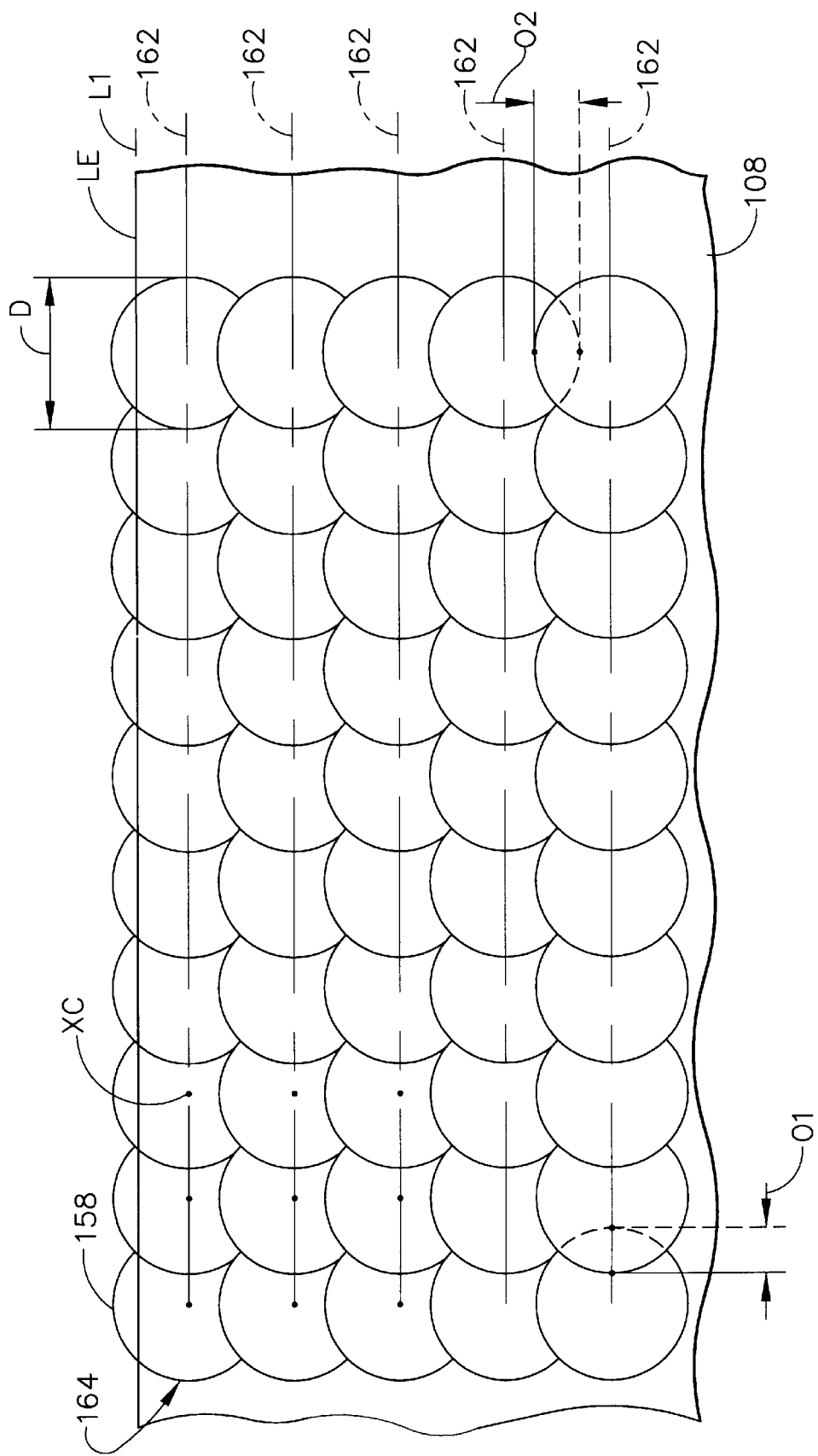
FIG. 9 is a schematic illustration of a pattern of laser shocked peened circular spots on a laser shock patch of the blade in FIG. 3.

FIG. 9 illustrates an exemplary pattern of stacked rows of overlapping laser shocked peened circular spots 158 (indicated by the circles). All the laser shocked peened circular spots 158 with their corresponding centers XC lie along a row centerline 162. The pattern of sequences entirely covers the laser shock peening coated surface 155. The laser shocked peened circular spots 158 have a diameter D in a row 164 of overlapping laser shock peened circular spots. The pattern may be of multiple overlapping rows 164 of overlapping shock peened circular spots on the laser shock peening coated surface 155. A first exemplary overlap, illustrated as about 30%, is between adjacent laser shock peened circular spots 158 in a given row. The overlap is typically defined by a first offset O1 between centers XC of the adjacent laser shock peened circular spots 158 and though illustrated as 30% it can vary from about 30%–50% or more of the diameter D. A second overlap is between adjacent laser shock peened circular spots 158 in adjacent rows and is generally defined by a second offset O2 between adjacent row centerlines 162 and though illustrated as 30% it can vary from about 30%–50% of the diameter D depending on applications and the strength or fluency of the laser beam. The pattern is referred to as stacked because the centers XC of adjacent circular spots 158 in adjacent rows are all linearly aligned. Other patterns are disclosed in the references, see U.S. Pat. Nos.: 5,591,009, 5,674,329 and 5,674,328.

Several sequences may be required to produce the entire pattern and re-taping of the first and second laser shock peened surfaces 154a and 154b, respectively, of the patch 145 is done between each sequence of laser firings. The test piece and workpiece versions of the blade 108 are preferably laser shock peened in the same manner to form the same sequences and patterns of laser shock peened circular spots 158. The laser firing each sequence has multiple laser firings or pulses with a period between firings -hat is often referred to a "rep". During the rep, the part is moved so that the next pulse occurs at the location cf the next laser shocked peened circular spot 158. Preferably, the part is moved continuously and timed to be at the appropriate location at the pulse or firing of the laser beam. One or more repeats of each sequence may be used to hit each laser shocked peened circular spot 158 more than once. This may also allow for less laser power to be used in each firing or laser pulse.

The production and test fan blades 108 and 109 typically may have an airfoil about 11 inches long, a chord length about 3.5 inches, and laser shock peening the first and second laser shock peened blade surfaces 154a and 154b respectively about 2 inches long along the leading edge LE. The laser shock peened blade surfaces 154a and 154b are about 0.5 inches wide (W). A first row 164 of laser shocked peened circular spots 158 nearest the leading edge LE extends beyond the leading edge by about 20% of the laser spot diameter D which is about 0.27" thus imparting deep compressive residual stresses in the pre-stressed blade regions 156a and 156b below the laser shock peened blade surfaces 154a and 154b, respectively, which extend about 0.5 inches from the leading edge.

While the preferred embodiment of the present invention has been described fully in order to explain its principles, it is understood that various modifications or alterations may be made to the preferred embodiment without departing from the scope of the invention as set forth in the appended claims.

We claim:

1. A method for quality control testing of a laser shock peening process of production workpieces, said method comprising the following steps:
    (a) mounting a test object having a metallic first test area in a laser shock peening apparatus,
    (b) forming at least one single first laser shock peened dimple in the first test area by firing a single pulse of a first laser beam from the laser shock peening apparatus such that beneath the first dimple is a first dimple region having deep compressive residual stresses imparted by the single pulse of the first laser beam,
    (c) measuring a first interior surface of the first dimple to obtain height data, and
    (d) processing the height data to obtain production volumetric data.

2. A method as claimed in claim 1 further comprising the following step:
    (e) comparing the production volumetric data from step (d) from the production workpieces in a laser shock peening production run of the production workpieces to a predetermined correlation of test piece volumetric data and high cycle fatigue failure based on high cycle fatigue tests of test pieces that were laser shock peened in the same or similar laser shock peening apparatus.

3. A method as claimed in claim 2 wherein the test pieces each have a failure precipitating flaw within a laser shock peened area of the test piece that was laser shock peened in the same or similar laser shock peening apparatus.

4. A method as claimed in claim 2 wherein the measuring is performed using a profilometer.

5. A method as claimed in claim 4 wherein the profilometer is an interferometric optical profilometer.

6. A method as claimed in claim 5 wherein the measuring in step (c) includes scanning the first interior surface of the first dimple in sections and then stitching together the sections and processing stitched together data to obtain the volumetric data.

7. A method as claimed in claim 6 wherein marks corresponding to the sections are placed outside of the dimple before the scanning so as to identify the sections for the stitching.

8. A method as claimed in claim 7 wherein the processing of the height data in step (d) includes masking out the dimple surface area to identify an undisturbed area around the dimple.

9. A method as claimed in claim 4 wherein the test object is a metallic coupon made of a material that is the same as or is similar to that of the production workpieces.

10. A method as claimed in claim 9 wherein step (b) further comprises forming a second laser shock peened dimple in a second laser shock peened test area on a second side of the test coupon opposite the first side of the test coupon opposite by simultaneously firing the single pulse of first beam and a single pulse of a second laser beam from the laser shock peening apparatus on the first and second laser shock peened test areas respectively such that beneath the second laser shock peened dimple is a second dimple region having deep compressive residual stresses imparted by the single pulse of the second laser beam.

11. A method as claimed in claim 10 wherein the measuring is performed using a profilometer.

12. A method as claimed in claim 4 wherein the test object is one of the production workpieces having a first laser shock peened surface comprising overlapping laser beam spots and a first laser shocked region having deep compressive residual stresses imparted by laser shock peening extending into the production workpiece from the first laser shock peened surface and the test area is outside of the first laser shock peened surface.

13. A method as claimed in claim 12 wherein the measuring is performed using a profilometer.

14. A method for laser shock peening and quality control testing of the laser shock peening process of gas turbine production blades during a production run, said method comprising the following steps:

(a) mounting one of the production blades in a production laser shock peening apparatus and laser shock peening the production blade to form a production laser shock peened patch on the production blade, (b) forming at least a single first laser shock peened dimple in a metallic first test area by firing a single pulse of a first laser beam from the production laser shock peening apparatus such that beneath the first dimple is a first dimple region having deep compressive residual stresses imparted by the single pulse of the first laser beam, (c) measuring a first interior surface of the first dimple to obtain height data, (d) processing the height data to obtain production volumetric data, and (e) comparing the production volumetric data from step (d) from to a predetermined correlation of test volumetric data and high cycle fatigue failure based on high cycle fatigue tests of test blades having corresponding test laser shock peened patches.

15. A method as claimed in claim 14 wherein the measuring is performed using a profilometer.

16. A method as claimed in claim 15 wherein the profilometer is an interferometric optical profilometer.

17. A method as claimed in claim 15 wherein each of the corresponding test laser shock peened patches contain at least one failure precipitating flaw.

18. A method as claimed in claim 14 wherein the first test area is on a metallic test coupon made of a material that is the same as or is similar to that of the production blades.

19. A method as claimed in claim 14 wherein the production blade has a first laser shock peened surface comprising overlapping laser beam spots and a first laser shocked region having deep compressive residual stresses imparted by laser shock peening extending into the production workpiece from the first laser shock peened surface and the test area is on The production blade outside of the first laser shock peened surface.

* * * * *